Jan. 23, 1968     U. SKIPPER     3,365,007
DIRECTIONAL DRILLING TOOL AND METHOD
Filed Oct. 24, 1965     2 Sheets-Sheet 1
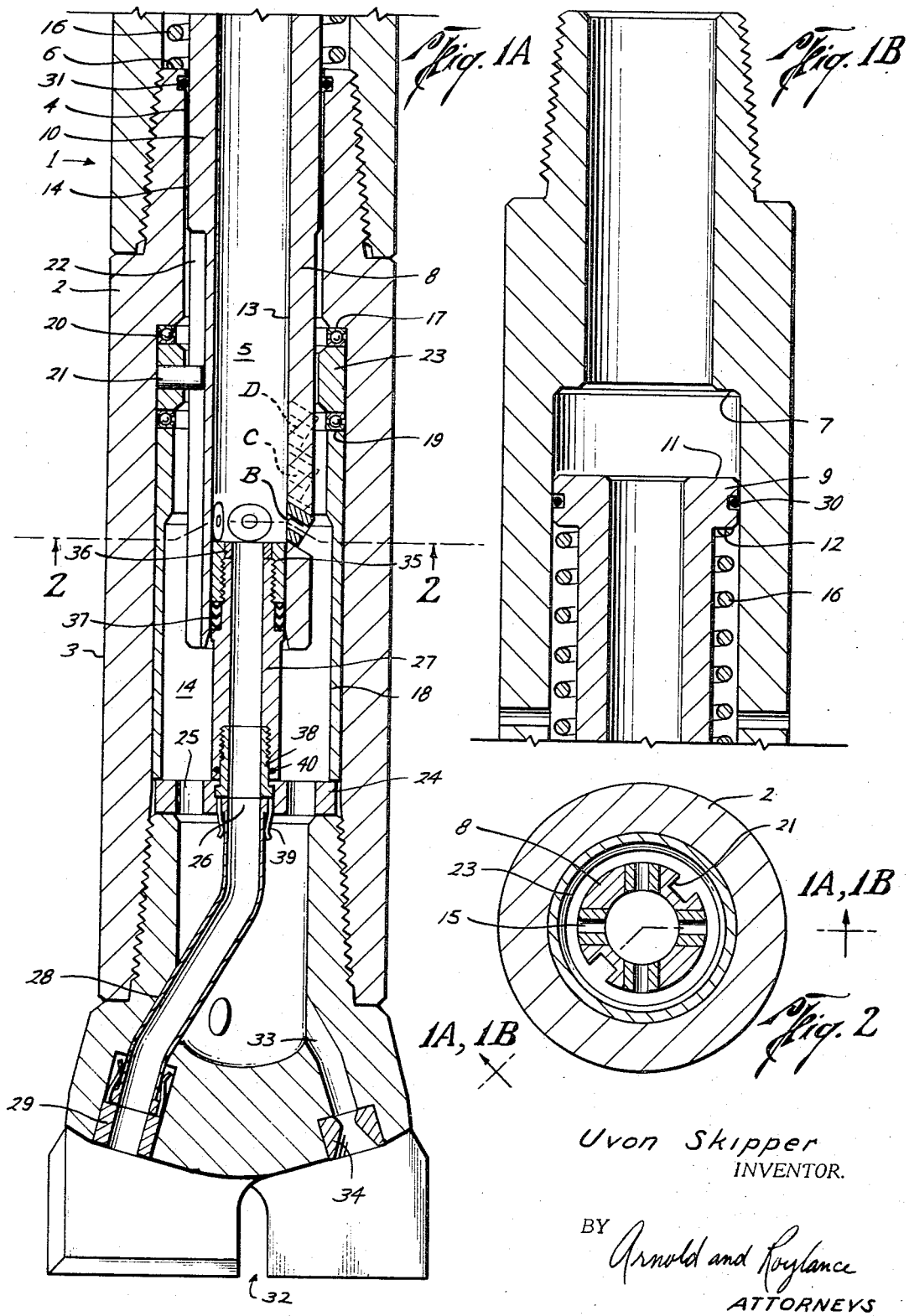
Uvon Skipper
INVENTOR.
BY Arnold and Roylance
ATTORNEYS Jan. 23, 1968　　　U. SKIPPER　　　3,365,007
DIRECTIONAL DRILLING TOOL AND METHOD
Filed Oct. 24, 1965　　　2 Sheets-Sheet 2

Uvon Skipper
INVENTOR.

BY Arnold and Roylance
ATTORNEYS

United States Patent Office 3,365,007
Patented Jan. 23, 1968

3,365,007
DIRECTIONAL DRILLING TOOL AND METHOD
Uvon Skipper, Houston, Tex., assignor to Wilson Supply Co., Houston, Tex., a corporation of Texas
Filed Oct. 24, 1965, Ser. No. 504,446
13 Claims. (Cl. 175—61)

ABSTRACT OF THE DISCLOSURE

Directional drilling is provided by use of a tool which is operably connected to a drill bit. The bit has at least one opening through which fluid under pressure may be passed to the adjacent formation, the opening being inclined with respect to the longitudinal axis of the borehole. Other openings are provided in the bit for normal drill bit travel. The tool contains a piston which is operable by pins in a programmed track, to selectively allow fluid communication to all the openings in the drill bit, or to block off all except the inclined opening.

---

This invention relates to a method and apparatus useful in directional drilling operations. More particularly, the invention relates to a tool having a plurality of nozzles or the like which transmit fluid communicated from the surface of a well to the formation to be drilled, wherein some of the nozzles may be closed by operations controlled from the earth's surface to increase the velocity of the fluid flow through the open nozzle or nozzles.

In the drilling of wells for the production of minerals such as oil and gas, it is often desired for one reason or another to drill a hole which is disposed at an angle with the vertical—this is, a "directional" drill. Usually, it is not desired to drill directionally until a vertical hole has been drilled to a certain depth. Furthermore, after the hole has been drilled directionally for a certain length, it is sometimes desired to begin to drill vertically again. That is, in the typical situation, only a relatively small portion or portions of the hole will be drilled at an angle to the vertical, and that portion or portions will be located downhole.

Numerous attempts have been made to develop apparatus or tools suitable for use in effecting this type of drilling, but none of them have proved completely suitable. In some instances, a single large jet has been employed to wash-out the formation. But this technique has not proved satisfactory because of the loss of hydraulic energy in drill fluids at deep formation.

It has also been proposed to use an indexing tool which has a plurality of jets, but in which the jets have to be perfectly aligned with the conduits in the tool, such alignment being accomplished by accurate threading. The disadvantage of such a tool is readily apparent; such alignment precision is not only difficult to build into the original tool, but it is difficult to maintain for appreciable periods of time in downhole operations.

Briefly, the present invention provides a tool which overcomes the problems of the prior art with, in a preferred embodiment, a tool which contains a plurality of ports. Fluid flow to one or more of these ports, as desired, is controlled by an axially movable valve having a programmed track inscribed in its surface and a rotating member having pins which operate in cooperative relationship with the camming track.

It is therefore an object of this invention to provide a tool suitable for use in directional drilling which includes a plurality of ports, some of which ports may be selectively opened and closed by operations controlled from the surface by a valve which includes a piston having a programmed track inscribed therein.

A further object of the invention is to provide a valve useful in such operations which includes an axially movable piston having a programmed track inscribed in its surface and a rotating member having pins which operate in cooperative relationship in the camming track.

Other objects and advantages of the invention will become apparent from the following description of the invention.

In order that the manner in which the foregoing and other objects of this invention are attained can be understood in detail, one advantageous embodiment of the invention will be described with reference to the accompanying drawings, which form a part of this specification, and wherein:

FIGURE 1 is a horizontal sectional view (the sections being taken as indicated in FIGURE 2) of a tool constructed in accordance with one embodiment of this invention, illustrating the tool in a first operating position, portions of the view being illustrated as FIGURES 1A and 1B.

FIGURE 2 is a view taken along the line 2—2 of FIGURE 1.

Figure 3:
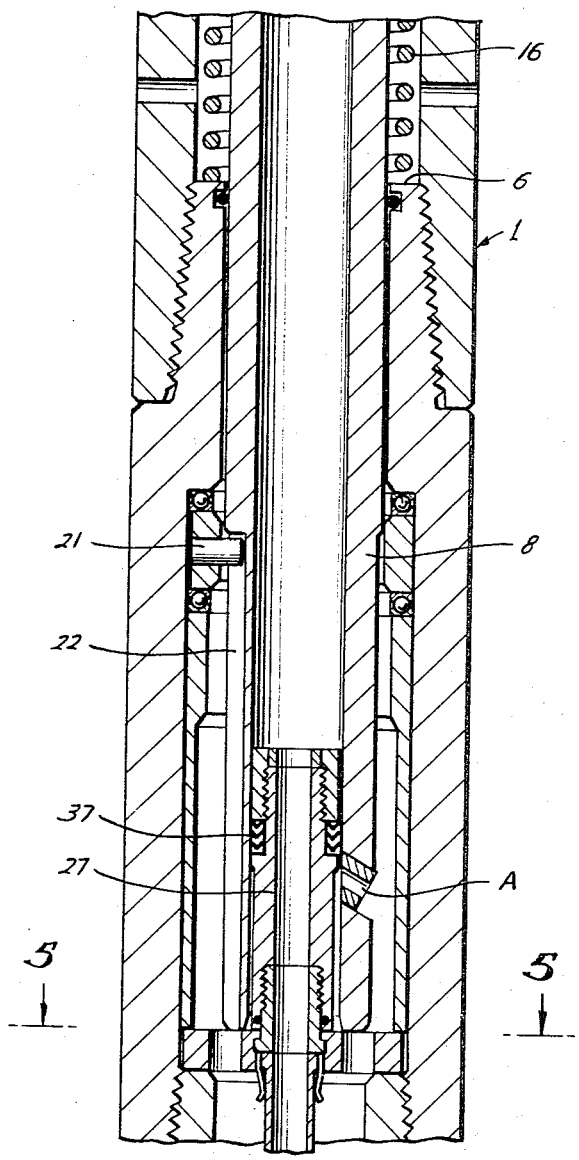
FIGURE 3 is a view similar to FIGURE 1, but showing the tool in another operating position.

Referring more particularly now to FIGURES 1-5, a tool 1 constructed in accordance with one embodiment of this invention is illustrated. Tool 1 comprises a generally tubular housing 2 which is illustrated in two threadedly engaged sections, although of course any convenient number of sections, for example one, may be employed. The housing 2 has an outer surface 3 and an inner surface 4, the inner surface defining an elongated chamber 5.

Recessed in the inner surface 4 of the housing is an area of enlarged diameter, thus forming radially extending shoulders 6 and 7 in the inner surface.

An elongated piston 8 having a radially outwardly extending head portion 9 and an elongated tubular body 10 is positioned in the chamber 5 in such a manner that the head is disposed in the area of enlarged diameter, while the tubular body portion is slidingly movable along the inner surface 4 beneath the enlarged area, and whereby the longitudinal axis of the piston is concentric with the longitudinal axis of the housing. Head portion 9 of the piston presents an annular upper face 11 opposite the body of the piston and an annular lower face 12 adjacent the body portion.

Body portion 10 of the piston presents an inner cylindrical surface 13 which defines an elongated flow chamber therethrough, and an outer cylindrical surface 14. Any convenient number of apertures 15, for example four, are provided in the body of piston 8 so as to provide fluid communication through this portion of the piston.

Means are inserted to urge the piston 8 in an upwardly direction; such means may take the form of coil spring 16 which may be desirably placed in the recessed area of inner surface 4 so that the lower end of the spring rests on the shoulder 6 and the upper end of the spring urges against the bottom face 12 of the piston head 9.

Figure 4:
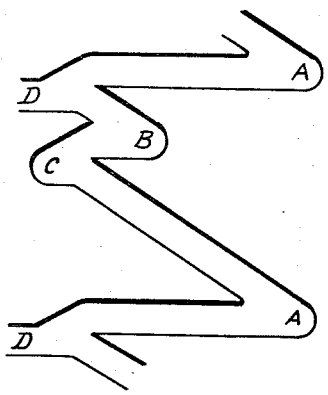
FIGURE 4 is a diagram of a preferred programmed track inscribed in the outer surface of the piston of the FIGURE 1 tool.
Figure 5:
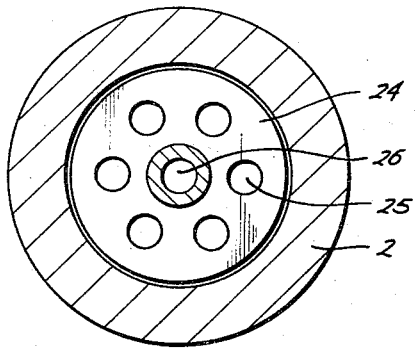
FIGURE 5 is a view taken along the line 5—5 of FIGURE 3.

Recessed in the outer surface 14 of the body portion 10 of piston 8 is a track or groove 22 which may desirably take the form illustrated in FIGURE 4. Four stops, as illustrated at A, B, C, and D, are provided in this track, the details of which will be explained in conjunction with the explanation of the operation of the tool below.

Recessed in the inner surface 4 of housing 2 is another area of enlarged diameter thus forming a radially extending annular shoulder 17. A spacer sleeve 18 of generally tubular configuration is provided in the lower part of this enlarged diameter area, presenting another radially extending annular shoulder 19. Each of the shoulders 17 and 19 is, of course, perpendicular to the longitudinal axis of the housing and the piston. Between these two shoulders is rotatably mounted in the housing, by means such as the bearings 20, a pair of pins 21 which are 180° apart and which extend radially inwardly toward the axis of the piston so as to be disposed in the track 22 of the piston. These pins may be desirably mounted in a larger ring 23, the outer cylindrical surface of which fits against the inner surface of the enlarged diameter area of the inner surface of the housing. In this manner, longitudinal movement of the piston is controlled by its movement in the track, such movement being governed by the pressure applied to the top face of the piston and by the position of the pin in the track. Although other pin, ring and track arrangements might be devised, this particular arrangement is preferred.

Mounted in the housing 2 beneath the lower extremity of the piston in its lowermost operating position is a generally flat cylindrical plate 24, the longitudinal axis of which is on the longitudinal axis of the housing. A suitable number of openings 25, for example six, and a single central axial opening 26 are provided to allow fluid communication between the longitudinal chamber 5 and a suitable drill bit 32 (for example, a rotary bit) located beneath the plate 24.

Onto the upper surface of the plate 24, and around the central opening 26 therein, is mounted a generally tubular packing member 27, concentrically oriented with the piston and the housing. The packer 27 may desirably be constructed of rubber or a rubber substitute. The outside diameter of packer 27 is just slightly smaller than the inside diameter of the piston 8, so that the outer surface of the packer fits snugly, in sliding relationship, against the surface 13. The packer 27 is of such a length as to extend upwardly past the apertures 15 when the piston is in its lowermost position, as illustrated in FIGURE 3. Thus it is seen that the packer 27 is so positioned that flow from the chamber 5 through the apertures 15 will be discontinued at such times as these apertures are around the packer 27.

Although various alternative arrangements of the packer 27 might be advantageously employed, the particular arrangement illustrated in the embodiments of FIGURES 1-5 has proved satisfactory. Here, the outside diameter of the packing member 27 is threaded at its upper end to receive a generally tubular packing nut 35. A flow bean 36 of erosion resistant material such as a ceramic material or silicon carbide is inserted at the upper end of member 27 between it and the packing nut 35. At the lower end of the junction between the packing member 27 and the nut 35 and at the outside diameter of each is a packing gland 37 which forms an effective seal against the inner surface 13 of the piston 8 as it moves up and down against the packing. At the lower end of the member 27 where it joins the plate 24 is conveniently positioned a suitable pipe adapter 38 in the manner illustrated in FIGURE 1, the adapter being tubular in configuration and adapted to fit into the member 27 at its lower end adjacent the plate 24. Any suitable clamping means such as that illustrated at 39 may be used to secure the adapter onto the conduit 28.

Through each of the openings 25 in plate 24 is a conduit 33 which allows fluid communication between the annular area between outer surface 14 of the piston and the spacer sleeve 18, and jet nozzles 34 in the bit 32. These nozzles, and related conduits 33, may be positioned in any convenient number and manner in the bit 32.

Through the central opening 26 in the plate 24 is a jet nozzle conduit 28 larger than the conduits 33 which communicates therebelow to jet nozzle 29 in bit 32. When fluid is directed through this nozzle at high pressures, as by blocking flow to the smaller jet nozzles, it will be readily understood that the area of the surrounding formation will be eroded. If the large jet nozzle conduit is positioned in a direction angular to the central longitudinal axis of the tool, then directional drilling of the surrounding formation may be realized by such increased velocity flow.

As will be readily understood by those skilled in the art, suitable seals such as the O-rings 30, 31, and 40 may be provided to insure the sealing sliding engagement between the piston and the housing, and of course other seals may be employed as desired.

*Operation*

In operation, the tool is inserted in a drill string in such a manner that the upper face 11 of the piston 8 is directed upwardly, and the bit 32 is adjacent the formation to be drilled. Suitable apparatus for the pumping of a drilling fluid under pressure, such as mud pumps, is positioned at the earth's surface and connected to the apparatus by way of suitable conduits.

With the tool in the FIGURE 1 position, it is seen that the pins 21 are positioned in the track at point B, and the apertures 15 are, as shown in FIGURE 1 (labeled "B"), above the packers 27 and 35. Thus, there is fluid communication between the chamber 5 and the bit 32 through both the central opening 26, and the large jet nozzle conduit 28, and the openings 25 in the end plate 24 and small jet nozzle conduits 33. In this position, then, the fluid pressure to the different nozzles 29 and 33 is approximately equalized, so that each such nozzle erodes the formation adjacent it at about the same rate and drilling proceeds in a generally vertical direction.

When it is desired to cut off communication through the small jet nozzles, and thus greatly increase the velocity of the fluid flowing through the large jet nozzle, to thereby greatly increase the rate at which the formation adjacent such nozzle will be eroded and consequently effect directional drilling, the piston is moved so that the apertures 15 are around the packer. This is conveniently done by first releasing the pressure applied from the mud pumps, which acts on the top face 11 of the piston, at which time the piston will move upwardly as far as the pin 21 will permit. This would be to the point C (see dotted lines labeled "C" in FIGURE 1 indicating position of apertures). With the piston in this position, there is still communication with the drill bit through the openings 25 as well as through central opening 26. Further upward movement of the piston is of course prohibited by the configuration of the track 22. At this point, pressure on the top of the piston 8 is increased by the mud pumps, causing the piston to move axially downward until the pins 21 engage the point A in the track. Here, the apertures will be in the position indicated in FIGURE 3, and fluid communication to the small jet nozzles will be terminated. Thus, all the fluid pressure is directed through the central opening 26 and thence through conduit 28 to the large jet nozzle 29. The greatly increased velocity of the fluid flowing in this conduit (as is readily apparent from the elementary laws of physics) will cause rapid erosion of the formation adjacent this nozzle.

After such erosion has continued for a sufficient length of time, drilling is resumed. The tool will naturally pass into the angular opening made by the large jet nozzle, and a directional drill will have been effected.

When it is desired to resume vertical drilling, communication is resumed through the small jet nozzles. This is done by reducing the mud pressure, thus allowing the piston to move upwardly by the urging of the coil spring 16 so that the pin 21 moves from the point A in the track to the point D, to the position illustrated by the dotted lines and labeled "D" in FIGURE 1. Then, the mud pressure is increased again, and the piston moves in such a manner that the pin is moved back to the original FIGURE 1 position at point B.

The operation may be similarly continued when and if additional directional drilling is desired.

Although the invention has been explained in terms of a particularly useful embodiment, it will be understood to those skilled in the art that various modifications and improvements may be made herein without departing from the scope of the invention.

I claim:
1. A method for accomplishing directional drilling by changing the normal path of drill bit travel, comprising:
   providing a drill bit in fluid communication through at least two different passageways with a generally tubular member, said drill bit including at least one inclined opening and at least one other opening for communication of fluid to the borehole, and said tubular member including a central conduit and a piston which is operable for longitudinal movement in the borehole, said movement being controlled by pins in said tubular member which move in a programmed track in said piston;
   positioning said drill bit in said borehole at the point wherein deviation from the normal direction of drill bit travel is desired;
   increasing fluid pressure in said central conduit to actuate said piston, thereby allowing fluid flow through said inclined opening while blocking fluid flow through at least one other opening;
   maintaining the bit stationary to concentrate fluid flow through said inclined opening to wash away a portion of the formation adjacent said inclined opening, to thereby form a deviation from the normal path of drill bit travel; and,
   reducing the fluid pressure in said conduit to thereby move said piston such that said blocked openings are opened, whereupon normal drilling is resumed.

2. Apparatus suitable for use in effecting directional drilling by causing a deviation in the path of drill bit travel comprising:
   a generally tubular housing defining an inner surface and an outer surface, said inner surface defining a central elongated passageway;
   a rotatable member mounted in said housing and carrying at least one pin which extends into said central passageway;
   an elongated piston of generally tubular configuration mounted in said housing and slidingly engageable with said housing over at least a portion of said inner surface, said piston including
      a programmed track in the outer surface thereof adapted to receive said pin, whereby longitudinal movement of the piston is controlled by movement of the pin in said track, and
   a drill bit having a number of fluid communicating openings therein, at least one of said openings adapted to be blocked by longitudinal movement of said piston, whereby a directional drill may be effected by the consequent increased velocity flow from the remaining opening or openings.

3. Apparatus suitable for use in effecting directional drilling by causing a deviation in the path of drill bit travel comprising:
   a generally tubular housing defining an inner surface and an outer surface, said inner surface defining a central elongated passageway;
   a rotatable member mounted in said housing and carrying at least one pin which extends into said elongated passageway;
   an elongated piston member of generally tubular configuration, mounted in said housing and slidingly engageable with said housing over at least a portion of said inner surface, said piston including
      a programmed track in the outer surface thereof adapted to receive said pin, whereby longitudinal movement of the piston is controlled by movement of the pin in said track,
      apertures in a portion of said piston, which are adapted by longitudinal movement of the piston to be opened and closed, and
   a drill bit having a plurality of fluid communicating openings therein, which receive fluid through said apertures and an inclined opening which receives fluid through the central chamber of said piston, wherein the flow of said fluid to said plurality of openings may be blocked by longitudinal movement of said piston, whereby a directional drill may be effected by the consequent increased velocity flow from said inclined opening.

4. Apparatus suitable for use in effecting directional drilling by causing a deviation in the path of drill bit travel comprising:
   a generally tubular housing defining an inner surface and an outer surface, said inner surface defining a central elongated passageway;
   a rotatably mounted member in said housing carrying at least one pin which extends into said elongated passageway;
   an elongated piston member of generally tubular configuration, mounted in said housing and slidingly engageable with said housing over at least a portion of said inner surface, said piston including
      a programmed track in the outer surface thereof adapted to receive said pin, whereby longitudinal movement of the piston is controlled by movement of the pin in said track, and
      apertures in the lower portion of the piston;
   a packing member located in said housing near the lower end of said piston, whereby said apertures are open when the piston is in an upper position, and the apertures are closed when the piston is in a lower position; and,
   a drill bit having a plurality of small openings adapted to receive fluid through said apertures, and a large opening inclined to the longitudinal axis of said piston, whereby closing of said apertures results in the ceasing of fluid flow through said small openings and increased velocity flow through said inclined opening, whereby a directional drill may be effected.

5. Apparatus suitable for use in effecting directional drilling by causing a deviation in the path of drill bit travel comprising:
   a generally tubular housing defining an inner surface and an outer surface, said inner surface defining a central elongated passageway;
   a rotatably mounted member in said housing carrying at least one pin which extends into said elongated passageway;
   an elongated piston member of generally tubular configuration, mounted in said housing and slidingly engageable with said housing over at least a portion of said inner surface, said piston including
      a radially extending annular flange at the uppermost portion thereof;
      a programmed track in the outer surface thereof adapted to receive said pin, whereby longitudinal movement of the piston is effected by the application of pressure to said annular flange, and is controlled by the movement of the pin in said track, and
      apertures in the lower portion of the piston;
   a packing member located in said housing near the lower end of said piston, whereby said apertures are open when the piston is in an upper position, and the apertures are closed when the piston is in a lower position; and,
   a drill bit having a plurality of small openings adapted to receive fluid through said apertures, and a large opening inclined to the longitudinal axis of said piston, whereby closing of said apertures results in the casing of fluid flow through said small openings and increased velocity flow through said inclined opening, whereby a directional drill may be effected.

6. The invention in accordance with claim 5, wherein there are two pins disposed at 180° from each other in said rotatably mounted member.

7. The invention in accordance with claim 5 wherein application of pressure to said flange is effected by the operation of mud pumps at the earth's surface.

8. The invention in accordance with claim 5, wherein an area of enlarged diameter is provided in said inner surface of said housing, defining a radially outwardly extending annular shoulder.

9. The invention according to claim 8, where an urging means is positioned between said shoulder and the flange of said piston, thereby urging said piston upwardly in said housing.

10. The invention in accordance with claim 4, wherein said packing member is affixed to a generally flat cylindrical plate having fluid communicating openings therein.

11. The invention according to claim 4, wherein said packing member is of generally tubular configuration.

12. Apparatus suitable for use in effecting directional drilling by causing a deviation in the path of drill bit travel comprising:
- a generally tubular housing defining an inner surface and an outer surface, said inner surface defining a central elongated passageway;
- a rotatably mounted member in said housing carrying at least one pin which extends into said elongated passageway;
- an elongated piston member of generally tubular configuration mounted in said housing and slidingly engageable with said housing over at least a portion of said inner surface, the interior of said piston defining an elongated conduit, said piston including
  - a programmed track in the outer surface thereof adapted to receive said pin, whereby longitudinal movement of the piston is controlled by movement of the pin in said track, and
  - apertures in the lower portion of the piston defining a zone of communication with plurality of conduits therebelow;
- a large jet nozzle inclined at an angle from the longitudinal axis of said piston and communicating with said elongated conduit;
- small jet nozzles communicating with said plurality of conduits; and,
- an annular packing member located in said housing near the lower end of said piston, whereby said apertures are open when the piston is in an upper position thus allowing flow to each said large jet nozzle and said small jet nozzles, and the apertures are closed when the piston in in a lower position, thus allowing flow to said large jet nozzle only and thus increasing the velocity of such flow to effect a directional drill.

13. Apparatus according to claim 12, wherein a pair of pins are disposed 180° apart in said rotatably mounted member.

References Cited

UNITED STATES PATENTS

| | | | |
|---|---|---|---|
| 1,918,096 | 7/1933 | Greve | 175—318 X |
| 2,176,375 | 10/1939 | McClinton | 175—317 X |
| 2,373,648 | 4/1945 | Boynton | 166—224 |
| 2,873,092 | 2/1959 | Dwyer | 175—61 |
| 3,183,933 | 5/1965 | Whitlock et al. | 137—625.29 X |
| 3,211,244 | 10/1965 | Cordary | 175—61 |

ERNEST R. PURSER, *Primary Examiner.*